United States Patent Office 3,062,293
Patented Nov. 6, 1962

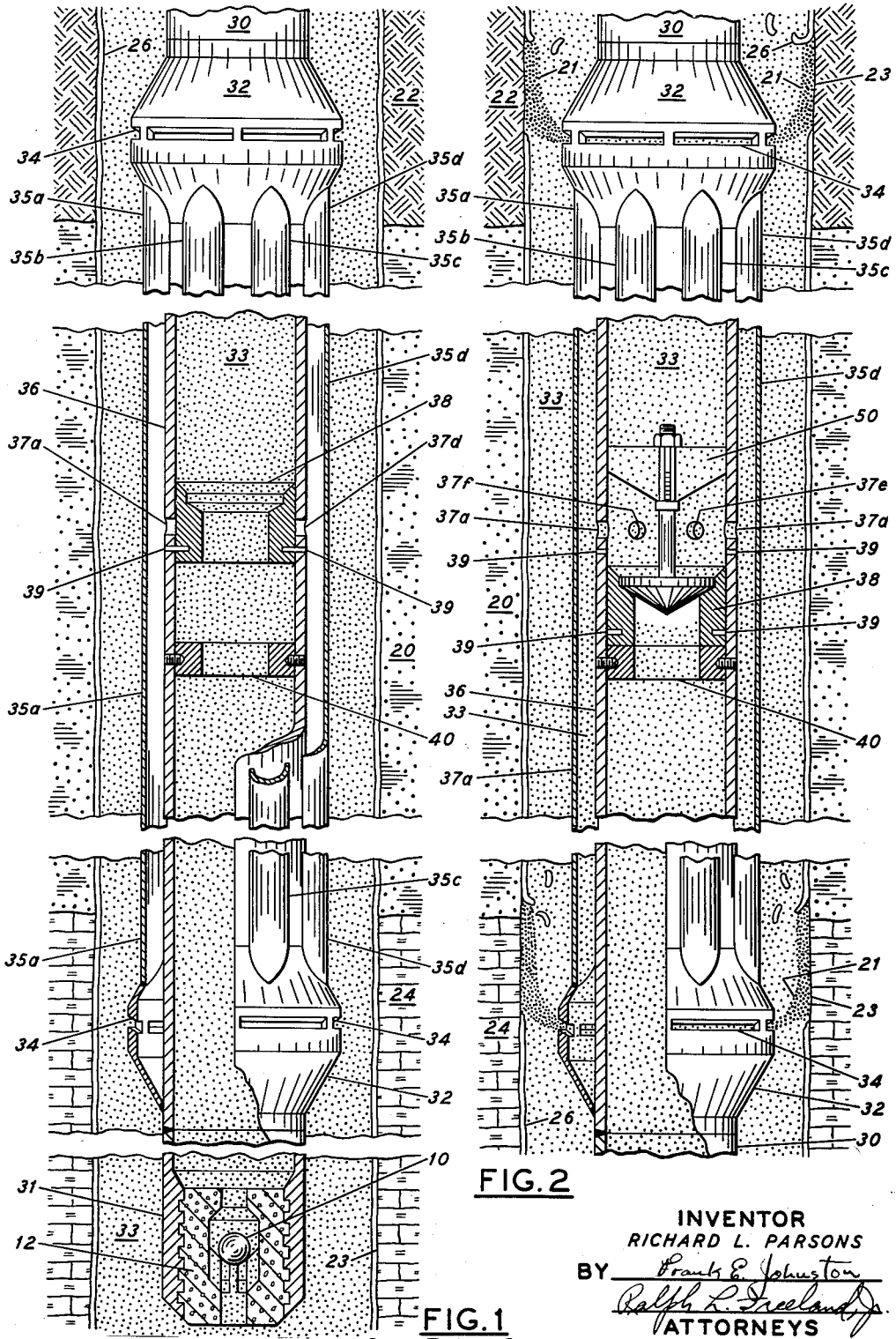

3,062,293
TWO-STAGE OIL WELL CASING CEMENTING WITH UPPER AND LOWER STATIONARY SLOTS FOR SECONDARY STAGE
Richard L. Parsons, Redwood City, Calif.,
Filed Dec. 15, 1959, Ser. No. 859,699
3 Claims. (Cl. 166—155)

This invention relates to well cementing and more particularly it releates to methods and apparatus in cementing operations wherein a stream of cement is impinged upon the borehole wall above and below a producing formation to remove filter cake, mud and other accumulations, thereby making a better bonding surface available between the cement and the borehole wall.

It is often desirable in oil well completion work to isolate a producing formation from the underlying and overlying strata. This is particularly desirable when these strata produce water which is likely to be forced along the wall of the borehole into the producing zone. The usual method of preventing this water production is to place an amount of cement between the casing and the borehole wall from the bottom of the well to a point somewhere above the producing formation. This cementing operation is usually accomplished by pumping cement through the casing out into the bottom of the well and then forcing it up between the well bore wall and the outside of the casing. A serious problem is encountered, however, because the borehole wall is covered with a layer of filter cake or dehydrated mud. The cement will set without displacing the mud, and channeling will result wherein water will flow through the channels left by the mud and into the producing formation. The removal of this filter cake and mud has been attempted by mechanical scrapers and chemical solvents. Neither of these methods has met with any particular degree of success. A method as taught by U.S. Patents 2,811,206 and 2,811,208, wherein cement is forced into the void between the casing and the borehole wall in the conventional manner and then flow diverted to a ring of jet ports in the casing where a stream of cement is forced against the borehole wall to peel the mud from the wall, has met with a greater degree of success. However, these patents teach the jetting process over only a limited vertical area at one time. Since, as noted above, it is necessary to isolate the producing formation from above and below, it becomes evident that the casing must be moved to accomplish the removal of the filter cake both above and below the producing formation. This is undesirable both because of the obvious difficulty of repeated moves of the casing and particularly so because the movement of the casing interferes with the proper hardening of the cement already in place.

It is an object of the present invention to obviate the necessity of moving the casing in cementing operations while obtaining the simultaneous removal of the borehole wall debris above and below the desired producing formation in order that a watertight seal of cement may be there effected. It is a further object of the invention to provide a better bonding surface between the cement and borehole wall by simultaneously peeling mud and filter cake from above and below the producing formation. It is a further object of this invention to provide apparatus to abrade filter cake and mud from the wall of a borehole, said apparatus to be incorporated in the casing and cemented in place in the borehole with said casing.

The novel and inventive features of the invention and further objects and advantages of the invention will become apparent from the following detailed description when read in connection with the accompanying drawings, which are incorporated herein and made a part of this disclosure.

In the drawings:

FIGURE 1 is a vertical section of an embodiment of the invention located in a borehole in combination with a conventional cement float shoe wherein cement slurry is being pumped through the casing, the hollow member and the ball valve into the void between the borehole wall and the casing.

FIGURE 2 is a vertical section of the same embodiment of the invention located in a borehole wherein a cement plug has seated in the cement collar and opened the port means on the hollow member to the cement slurry, thus causing jetting action at the slots in the annular chambers.

In a preferred embodiment of the invention, there is provided in combination with the casing pipe and conventional float shoe an elongated hollow member that can be interconnected with and serve as a portion of the casing. This hollow elongated member may be either a section of the casing which is to be used in casing the borehole whereon the other elements of the apparatus are attached, or the hollow elongated member may be a section of pipe on which the other elements of the apparatus are attached similar to the casing pipe which can be fitted into the casing string. Vertically spaced on this hollow member are a pair of tubular members so connected to the hollow member as to form annular chambers. The spacing is dependent on the thickness of the formation which is to be isolated; one annular chamber spaced to provide jetting action above the formation, the other annular chamber spaced to provide jetting action below the formation. This jetting action is supplied by forcing the cement slurry under pressure through a number of elongated slots formed on the periphery of the annular chambers. The slots should have a limited width dimension and should be spaced on the circumference to form a ring around the annular chamber. The incorporation of the ring of slots allows the jetting action to work in a circular plane around the interior of the borehole so that the filter cake is effectively removed over a continuous ring on the inside wall without interspacing of mud, thus giving the cement a connecting circular bonding area. In the preferred embodiment, the slots are inclined from the horizontal in order that the jetting action may strike the borehole wall at an angle in order to give a more pronounced peeling effect, thereby enhancing the removal of the filter cake. Interconnecting the tubular chambers with port means on the hollow member are a plurality of restricted passageways. These passageways could take the form of sections of small-diameter pipe which had been divided into halves along their long axis and subsequently attached to the circumference of the hollow member. The port means in the hollow member are located approximately half way between the annular chambers so as to give even flow to both chambers. Inside the hollow member, spaced near the port means, is a unit which is capable of converting from cement flow through the casing to cement flow through the port means located in the side of the tubular member. This device, which is known in the art as a cement collar, is typified by the device described in the Eadie Patent No. 2,811,208.

A typical method of operation involves determining the vertical increment that is to be sealed off and the depth of this increment from the surface of the earth. The apparatus is then attached to the casing at the appropriate position and hung in the borehole as a part of the casing. A typical float shoe containing a ball valve assembly is attached to the lower end of the casing. Cement slurry is then pumped down the interior of the casing through the ball valve into the bottom of the borehole. As the amount of cement slurry increases, it begins to fill up the opening between the outside of the casing and the filter cake on the borehole. Sufficient cement slurry is pumped in this manner until the annular space between the casing and the well bore wall is filled to a predetermined level which is generally located somewhere above the top of the producing formation. Since the cement collar is covering the port means in the hollow member of the apparatus, the hollow member will function as a part of the casing and cement slurry will flow through it and will not flow through the port means or clog the port means. When the predetermined amount of cement slurry has been injected into the borehole, a cement plug is inserted into the slurry and is flowed through the casing into the hollow member where it comes to rest in the means provided in the cement collar. Since the cement can no longer flow through the hollow member, the pressure builds up until the pressure release mechanism is activated to open the port means located above the collar. Cement slurry flows through the port means into the restricted passageway means and on to the annular chamber from where it is sprayed out under great force against the borehole walls both above and below the producing formation. Based on experimental work with various types of dehydrated mud and filter cake, it has been found that a jetting velocity of 50 feet per second is quite adequate for abrading away the undesired debris. In many types of filter cake, jetting velocities of 30 feet per second and below have proved adequate. The jetting action peels the filter cake and mud from the borehole wall, and the sprayed slurry mixes with the already present slurry which had been flowed through the cement shoe to form a watertight bond in the areas that have been cleared of the mud cake and filter both above and below the producing formation. Since the entire operation is done simultaneously, the cement has an opportunity to set more firmly than if the jetting were first accomplished at one level and then the whole casing lowered or raised a given distance, disturbing the setting cement, to repeat the jetting action to complete sealing off the producing formation. It should be noted that the casing may be rotated in the hole during the jetting action to give a better abrading effect since rotation may be accomplished during the continuous injection of slurry, does not require any time-consuming operations that are attendant a vertical readjustment, and does not interfere with the cement injecting operation. A slight vertical movement which would not disturb the setting cement or require shutoff of the cement slurry flow might be desirable under certain conditions to increase the effect of the abrading action.

The vertical distance between the annular chambers is dependent on the thickness of the formation which is to be isolated. The width and length of the slots on the periphery of the annular chambers will be determined by a number of factors. It is important to understand the physical characteristics of the cement slurry when determining the width of the slot to be utilized. In oil well completion work the cement slurry is a combination of Portland cement and water, which is mixed together in various ratios. The average size of a particle of Portland cement is about 25 microns. In screening tests, it has been found that all but about 1 percent of a typical cement slurry will pass through a 200-mesh screen and that all of the cement slurry will pass a 50-mesh screen. Translated into inches, this means that all the cement slurry will pass through a slot $\frac{1}{100}$ of an inch wide and that almost all of the cement slurry will pass through $\frac{1}{350}$-of-an-inch slot. Therefore, the lower end of the width dimension would seem to be not less than $\frac{1}{350}$ of an inch. Since, however, as was discussed above, the jetting velocities should be in the 30- to 50-feet-per-second range to be effective, the more narrow slots will tend to abrade and lose their width dimension more rapidly. Therefore, for extremely narrow slot width, tungsten carbide inserts should be fitted into the annular chambers to act as slots, thereby increasing the wearing life and facilitating the replacement in order to maintain the desired width. The upper limit of slot width depends primarily on the velocity desired to be maintained taken in conjunction with the volume of and pressure asserted on the cement slurry. A prime factor in selecting the width dimension of the slots is consideration of the particular type of filter cake that is adhering to the wall of the well bore. As is well known in the drilling art, there are a large number of drilling muds now being utilized. Included in this grouping are water-base muds, oil-emulsion mud, and oil-base muds. The various types of muds all deposit a different type of filter cake on the well bore wall. However, the filter cake is generally found as a very tough rubber-like material which adheres quite strongly to the borehole wall. It has been found that because of this toughness the jetting action, in order to be effective, must actually be directed at the mud to be removed. There seems to be no great tendency for the mud to be chipped or flaked off unless the jetting stream is directed at all the filter cake to be removed. It is therefore important that the jetting action form a continuous interconnecting ring around the borehole wall in order to completely clear a bonding surface. One application not intended to limit the invention but rather as a guide to what can be expected, wherein cement slurry is injected at a rate of 500 gallons a minute into the casing, would allow some 50 inches of $\frac{1}{16}$-inch slots to be spaced around the periphery of the two annular chambers and the velocity maintained at 50 feet per second. As has been noted above, it is important that the slots form at least one complete ring around the periphery of each of the annular chambers so that the most complete and effective jetting action can be obtained. The slots, of course, must be divided into segments by interconnecting support members. However, these interconnections should be kept as narrow as possible so that the ring effect may be obtained.

Referring to FIGURE 1, the hollow member 36 is connected at the top to casing 30 and at the bottom to cement float shoe 31. The tubular members are attached to the hollow member 36 to form annular chambers 32 both above and below the producing formation 20. The slots 34 are located around the circumference of the annular chambers 32 in a plane normal to the center line of the hollow member 36. In the embodiment as shown in FIGURE 1, there is a single ring of slots 34 on each annular chamber 32. Depending on the diameter of the annular chamber and the width of the slot, two or more rows of slots could be incorporated into each of the annular chambers. The restricted passageway means 35a, 35b, 35c, 35d 35e, and 35f interconnect the annular chambers 32 with each other and with port means 37a, 37b, 37c, 37d, 37e and 37f in the hollow member 36. The cement collar assembly including sleeve 38, shear pins 39, and seat 40 is located inside of the hollow member near port means 37a, 37b, 37c, 37d, 37e and 37f. Overlying strata 22 and underlying strata 24 along with producing formation 20 are pierced by borehole 23. Since it is desired to isolate the producing formation 20 from water at shale formations 22 and 24, the slots 34 are located opposite these formations in order that a watertight seal may be formed by abrading filter cake 26 from borehole wall 23 so that a better seal may be effected between the wall and the cement. Cement slurry 33 is being injected into the void between the hollow member 36 and the borehole walls 23 through cement float shoe 12 at ball valve 10. This injection continues until a predetermined volume of cement is injected.

As depicted in FIGURE 2, a cement plug 50 which had been inserted into the cement slurry 33 after a predetermined amount of cement had been injected has seated in the cement collar sleeve 38, and the increased pressure on shear pins 39 has caused the pins to fail, allowing sleeve 38 to slide down to cement collar seat 40 thus exposing port means 37a, 37b, 37c, 37d, 37e, and 37f to the cement slurry. The slurry flows through the port means 37a, 37b, 37c, 37d, 37e, and 37f into the restricted passageway means 35a, 35b, 35c, 35d, 35e, and 35f and thence into annular chambers 32 from where it is forced in a jetting action 21 through slots 34 against borehole wall 23 to peel filter cake 26 from the borehole wall 23. The slots in this embodiment are inclined a slight amount from the horizontal in order that the jet stream 21 may incorporate a peeling action along with an abrading action on the filter cake 26. The angle of inclination may vary from 0 to 20° with the preferred embodiment being about 10°.

From the foregoing description, it may be seen that the present invention operates simply and in a novel manner to remove filter cake and mud from the wall of a borehole during cementing operations without the necessity of repositioning the tool to completely seal off a producing formation. Although only a few preferred methods and modes of construction have been illustrated and described, those skilled in the art will be able to perceive numerous modifications, variations, and changes in this invention that could be made without departing from the spirit thereof. All such modifications, variations, and changes that could be made in the arrangements, methods, and modes described herein that fall within the scope of the appended claims are intended to be embraced thereby.

I claim:

1. Well cementing apparatus for positioning in a well as a portion of a well casing and to be cemented therein, said apparatus comprising a hollow elongated member, at least a pair of tubular members secured on the exterior of said elongated member to form annular chambers therewith, said chambers vertically separated a preselected distance to bridge a desired formation, means on the exterior of said elongated member forming therewith a passageway for cement slurry interconnecting said annular chambers, port means in said elongated member intermediate said tubular members and communicating with said passageway, slot means in the outer walls of said tubular members, said slot means forming susbtantially a continuous ring in said walls of said tubular members and said slot means inclined at an angle of from zero to 20° from the plane normal to the centerline of said elongated member, and means movable for opening said port means to the flow of cement slurry, said means initially positioned on the inside wall of said elongated member closing said port means.

2. Apparatus as in claim 1 where said slot means are about 1/16 of an inch in width and inclined at an angle of about 10° from the plane normal to the centerline of said elongated member.

3. Well cementing apparatus for positioning in a well as a portion of a well casing and to be cemented therein, said apparatus comprising a hollow elongated member, a pair of tubular members secured on the exterior of said elongated member to form annular chambers therewith, said chambers vertically separated a preselected distance to bridge a desired formation, means on the exterior of said elongated member forming therewith a passageway for cement slurry interconnecting said annular chambers, port means in said elongated member intermediate said tubular members and communicating with said passageway, slot means in the outer wall of said tubular members, said slot means forming substantially a continuous ring in said wall of said tubular members and said slot means inclined at an angle of from zero to 20° from the plane normal to the centerline of said elongated member, means movable for opening said port means to the flow of cement slurry, said means initially positioned on the inside wall of said elongated member closing said port means, and means for moving said movable means whereby cement slurry is caused to flow through said ports and said passageway to said annular chambers from where said slurry is directed radially outward by said slot means in a continuous ring against the wall of said well to peel accumulated debris therefrom.

References Cited in the file of this patent

UNITED STATES PATENTS

| 1,629,018 | Coberly | May 17, 1927 |
| 2,119,349 | Pearce | May 31, 1938 |
| 2,191,750 | Brown | Feb. 27, 1940 |
| 2,196,652 | Baker | Apr. 9, 1940 |
| 2,811,206 | Klotz | Oct. 29, 1957 |
| 2,811,208 | Eadie | Oct. 29, 1957 |